(12) United States Patent
Wang et al.

(10) Patent No.: US 9,302,939 B2
(45) Date of Patent: Apr. 5, 2016

(54) METHOD FOR MANUFACTURING STONE MATERIAL USING MOLTEN SLAG

(75) Inventors: Qingtao Wang, Shandong (CN); Xianjin Yu, Shandong (CN); Xin Zhao, Shandong (CN); Benkui Gong, Shandong (CN); Zhenxia Wei, Shandong (CN); Yueyun Li, Shandong (CN); Jun Ming, Shandong (CN)

(73) Assignee: SHANDONG COKING GROUP CO., LTD., Shandong (CN)

( * ) Notice: Subject to any disclaimer, the term of this patent is extended or adjusted under 35 U.S.C. 154(b) by 242 days.

(21) Appl. No.: 13/820,569

(22) PCT Filed: Sep. 20, 2011

(86) PCT No.: PCT/CN2011/079894
§ 371 (c)(1),
(2), (4) Date: Mar. 4, 2013

(87) PCT Pub. No.: WO2012/041172
PCT Pub. Date: Apr. 5, 2012

(65) Prior Publication Data
US 2013/0175736 A1    Jul. 11, 2013

(30) Foreign Application Priority Data
Sep. 27, 2010  (CN) .......................... 2010 1 0293048

(51) Int. Cl.
*C04B 5/00* (2006.01)
*C04B 5/06* (2006.01)

(52) U.S. Cl.
CPC .... *C04B 5/00* (2013.01); *C04B 5/06* (2013.01)

(58) Field of Classification Search
CPC .................................. C04B 5/00; C04B 5/06
USPC ......................................... 264/299, 319, 332
See application file for complete search history.

(56) References Cited

U.S. PATENT DOCUMENTS

| | | | | |
|---|---|---|---|---|
| 3,133,804 A * | 5/1964 | Hardgrove | ...................... | 65/141 |
| 3,223,508 A * | 12/1965 | Wolf | ................................ | 65/142 |
| 3,531,270 A * | 9/1970 | Grady | ................................. | 65/19 |
| 4,376,805 A * | 3/1983 | Esnoult | ................. | C04B 35/657 |
| | | | | 264/135 |
| 4,918,034 A * | 4/1990 | Weinstein | ............... | B28B 7/342 |
| | | | | 264/332 |
| 4,943,398 A * | 7/1990 | Endo | ......................... | B28B 7/34 |
| | | | | 164/7.1 |
| 5,361,841 A * | 11/1994 | Hale et al. | ..................... | 166/293 |
| 5,626,646 A * | 5/1997 | Krofchak | .................. | C04B 5/06 |
| | | | | 106/789 |
| 5,865,872 A * | 2/1999 | Krofchak | .................. | C04B 5/06 |
| | | | | 420/590 |
| 6,311,522 B1 * | 11/2001 | Berry et al. | ........................ | 65/19 |
| 6,592,640 B1 * | 7/2003 | Rosenflanz | .............. | B24D 3/06 |
| | | | | 264/332 |
| 6,596,041 B2 * | 7/2003 | Rosenflanz | .............. | B24D 3/06 |
| | | | | 264/332 |
| 2005/0051057 A1 * | 3/2005 | Evans et al. | .............. | 106/287.34 |
| 2008/0017077 A1 * | 1/2008 | Abbate | ................. | C04B 18/027 |
| | | | | 106/679 |
| 2010/0035037 A1 * | 2/2010 | Marlin | ............... | C01G 45/1264 |
| | | | | 428/220 |
| 2012/0073406 A1 * | 3/2012 | Ki et al. | .......................... | 75/414 |
| 2013/0167586 A1 * | 7/2013 | Wang et al. | ....................... | 65/19 |
| 2013/0206875 A1 * | 8/2013 | Solvi et al. | ........................ | 241/3 |
| 2013/0292878 A1 * | 11/2013 | Solvi et al. | ..................... | 264/299 |
| 2014/0247856 A1 * | 9/2014 | Harada et al. | ...................... | 373/8 |

FOREIGN PATENT DOCUMENTS

| | | |
|---|---|---|
| CN | 1065646 | 10/1992 |
| CN | 1923741 | 3/2007 |
| CN | 101020968 | 8/2007 |
| CN | 101121948 | 2/2008 |
| CN | 101259987 | 9/2008 |
| CN | 101289332 | 10/2008 |
| CN | 101318787 | 12/2008 |
| CN | 101323503 | 12/2008 |
| CN | 101372405 | 2/2009 |
| CN | 101559953 | 10/2009 |
| CN | 101698568 | 4/2010 |
| CN | 101805128 | 8/2010 |
| JP | S5088106 | 7/1975 |
| JP | S5573804 | 6/1980 |
| JP | S55140725 | 11/1980 |
| JP | H0564779 | 3/1993 |

OTHER PUBLICATIONS

International Search Report for PCT/CN2011/079894, English translation attached to original, Both completed by the Chinese Patent Office on Dec. 5, 2011, All together 8 Pages.

* cited by examiner

*Primary Examiner* — Joseph S Del Sol
*Assistant Examiner* — Nahida Sultana
(74) *Attorney, Agent, or Firm* — Brooks Kushman P.C.

(57) ABSTRACT

A method for manufacturing a reconstituted stone raw material by using a molten slag includes: controlling a temperature of the molten slag at 1400° C.-1500° C., and performing a cast-molding process on the molten slag; and maintaining the cast-molded slag at a temperature of 800° C.-1000° C. for 1-5 hours in a non-reducing atmosphere, and then gradually cooling the cast-molded slag to a room temperature within 2-5 hours to obtain the reconstituted stone raw material. An energy-saving and efficient method for comprehensively utilizing the blast furnace slag is provided. The produced reconstituted stone raw material has such characteristics as stable color quality, abrasion resistance, pressure resistance, strong adhesiveness, low coefficient of expansion and low shrinkage ratio.

6 Claims, No Drawings

METHOD FOR MANUFACTURING STONE MATERIAL USING MOLTEN SLAG

CROSS-REFERENCE TO RELATED APPLICATION

I. This application is the U.S. national phase of PCT Appln. No. PCT/CN2011/079894 filed on Sep. 20, 2011, which claims priority to CN Patent Application No. 201010293048.8 filed on Sep. 27, 2010, the disclosures of which are incorporated in their entirety by reference herein.

FIELD OF THE INVENTION

The present invention relates to the technical filed of inorganic nonmetal material, more particularly, to a method for manufacturing a reconstituted stone raw material by using a molten slag.

DESCRIPTION OF RELATED ART

The ferrous metallurgy industry has produced a huge amount of waste slag which may be hardly brought to multipurpose utilization. The existing waste slag has already become a major culprit for environment pollution and a factor that limits the development of the metallurgy industry. The disposal of the waste slag generally used in current industry is as follows: discharging a slag from a furnace at 1500-1600° C.; cooling down the slag by using water (referred to as "water quench" in practice); picking up and drying the slag; and making the dried slag into powders to be used to manufacture cement. However, the above process can only deal with a part of waste slag, moreover, said process may produce waste water and waste gas, and, what's worse, a large amount of sensible heat contained in the blast furnace slag is wasted and may bring further pollution to the environment.

Since the current production and research on the use of blast furnace slag are based on the waste slag processed by water quench, the consumption of fresh water to cool down the waste slag cannot be reduced, and the heat energy contained in the molten slag is not efficiently utilized, moreover, there might be a secondary waste generated and not all the waste slag can be processed and utilized.

Therefore, it is desired to provide a method for effectively utilizing the huge amount of furnace slag.

SUMMARY OF THE INVENTION

An object of the present invention is to provide a method for manufacturing a reconstituted stone raw material by using a molten slag.

In order to achieve the above object of the present invention, the present invention provides a method for manufacturing a reconstituted stone raw material by using a molten slag including: controlling a temperature of the molten slag at 1400° C.-1500° C., and performing a cast-molding process on the molten slag; and maintaining the cast-molded slag at a temperature of 800° C.-1000° C. for 1-5 hours in a non-reducing atmosphere, and then gradually cooling the cast-molded slag to a room temperature within 2-5 hours to obtain the reconstituted stone raw material, wherein the molten slag includes 10-40 wt % of $Al_2O_3$, 5-25 wt % of MgO, 10-50 wt % of $SiO_2$, 10-40 wt % of CaO, 0.1-5 wt % of $TiO_2$, 0.1-5 wt % of FeO and 0.1-5 wt % of MnO. More particularly, a cooling rate may be preferably 1.5-10° C. per minute.

In an embodiment of the present invention, before the cast-molding process at a controlled temperature, the molten slag is introduced into a pool for preserving heat and modifying and a temperature of the molten slag is maintained at 1450-1600° C. to adjust a composition and/or a color of the molten slag according to requirements of a resulting product.

In an embodiment of the present invention, the molten slag includes 10-20 wt % of $Al_2O_3$, 5-10 wt % of MgO, 20-35 wt % of $SiO_2$, 20-30 wt % of CaO, 0.1-5 wt % of $TiO_2$, 0.1-5 wt % of FeO and 0.1-5 wt % of MnO.

In an embodiment of the present invention, a composition modifier to adjust the composition may be at least one of clay, porcelain clay, lodestone, pottery clay, feldspar and quartz sand, and is added in an amount of 0-10 wt % based on a weight of the molten slag. A color modifier to adjust the color may be at least one of oxides of Ti, Cr, Ni, Cu, Co and Fe, ore powders and industry wastes containing the oxides (such as red mud generated by $Al_2O_3$ manufacture), and is added in an amount of 0-5 wt % based on a weight of the molten slag.

In an embodiment of the present invention, the casting-molding process may be performed in a mold or arbitrarily performed without a mold.

In an embodiment of the present invention, the molten slag is a molten slag directly discharged from a metallurgy reactor or a remolten slag.

DETAILED DESCRIPTION OF THE PREFERRED EMBODIMENTS

Embodiments according to the present invention will be described in detail hereinafter.

A molten blast furnace slag is a waste produced in iron making using a blast furnace, which includes 10-40 wt % of $Al_2O_3$, 5-25 wt % of MgO, 10-50 wt % of $SiO_2$, and 10-40 wt % of CaO as well as a small amount of FeO, C, MnO, S and the like, and the temperature of which is in the range of 1350° C.-1480° C. Preferably, the molten blast furnace slag includes 10-20 wt % of $Al_2O_3$, 5-10 wt % of MgO, 20-35 wt % of $SiO_2$, and 20-30 wt % of CaO as well as a small amount of FeO, C, MnO, S and the like.

An embodiment of the present invention provides a method for manufacturing a reconstituted stone raw material by using a molten slag, and the molten slag may include 10-40 wt % of $Al_2O_3$, 5-25 wt % of MgO, 10-50 wt % of $SiO_2$, 10-40 wt % of CaO, 0.1-5 wt % of $TiO_2$, 0.1-5 wt % of FeO and 0.1-5 wt % of MnO. Preferably, the molten slag may include 10-20 wt % of $Al_2O_3$, 5-10 wt % of MgO, 20-35 wt % of $SiO_2$, 20-30 wt % of CaO, 0.1-5 wt % of $TiO_2$, 0.1-5 wt % of FeO and 0.1-5 wt % of MnO. The molten slag may be a molten slag directly discharged from a metallurgy reactor or a remolten slag. According to the method of the present invention, the molten slag discharged from the blast furnace may be directly utilized, thereby not only saving the power consumption for melting a raw material, but also avoiding the consumption of water for cooling down the blast furnace slag by water quench and the generation of a secondary waste.

In the method of the present invention, the temperature of the molten slag in a pool for preserving heat and modifying is controlled to be in the range of 1450° C.-1600° C. Whether a modification is made to the molten slag or not may be determined according to the requirements for hardness, density, color and the like of a product, wherein the modification includes an adjustment of composition and/or color.

More particularly, a composition modifier may be at least one of clay, porcelain clay, lodestone, pottery clay, feldspar and quartz sand. The composition modifier is added in an amount of 0-10 wt % based on a weight of the molten slag. A color modifier may be at least one of oxides of Ti, Cr, Ni, Cu, Co and Fe, such as $TiO_2$, $Cr_2O_3$, NiO, CuO, $Cu_2O$, CoO, FeO, $Fe_2O_3$ and the like, ore powders containing these oxides and industry wastes containing these oxides, such as waste slag (red mud) generated by $Al_2O_3$ manufacture. The color modifier is added in an amount of 0-5 wt % based on a weight of the molten slag.

Then, the modified or unmodified molten slag is cast-molded at a controlled temperature of 1400° C.-1500° C. More particularly, during cast-molding at the controlled temperature, the modified or unmodified molten slag may be molded in a mode or without a mold. When a reconstituted stone raw material with a certain shape and size is desirable, the modified or unmodified molten slag may be molded in a mode having a corresponding shape and size. Alternatively, the molten slag may be naturally shaped by the action of the gravity force in an open ground, thereby preparing stone raw materials with various shapes, for example, a landscape stone used in a public such as a residential quarter and a park. In particular, whether the cast-molding is performed using a mold or without a mold, the color modifier may be added to change color according to the use of the desired stone raw material. Alternatively, with respect to the cast-molding performed in a mold, the mold may be selected to have a corresponding size and shape according to a size of a desired stone material; and with respect to the cast-molding performed without a mold, a size of a resulting stone material may be controlled by controlling a flux and a flow rate during the cast-molding.

Next, the cast-molded slag is maintained at 800° C.-1000° C. for 1-5 hours in a non-reducing atmosphere, and then is naturally cooled to a room temperature gradually within 2-5 hours so as to obtain the desired reconstituted stone raw material (such a process is similar to a formation of petrosilex, thus the resulting material is referred to as "reconstituted stone material"), wherein, the cooling rate is 1.5-10° C. per minute. If the cooling rate is too great, a defect will occur; and if the cooling rate is too small, the equipment efficiency and process efficiency will be decreased.

The solution of the blast furnace molten slag may be crystallized into various minerals at different temperatures and for different time durations. For example, the blast furnace molten slag may be grown into a rock including melilite crystals as a major component at 1280° C. for 1 hour, may be grown into a rock including diopside as a major component at 1000-900° C., or may be grown into a solid with a glass phase by decreasing the temperature quickly and maintaining it at a temperature of 500-200° C., and the solid with the glass phase may be re-crystallized into a rock with a crystal phase by being heated to a temperature of 1100° C. and maintained at the temperature for 1 hour.

Hereinafter, the examples of the present invention will be described in detail.

Example 1

A molten slag including 15 wt % of $Al_2O_3$, 15 wt % of MgO, 30 wt % of $SiO_2$, 35 wt % of CaO, 1 wt % of $TiO_2$, 2 wt % of FeO and 2 wt % of MnO was used as an original material. Quartz sand was added to the molten slag having a temperature of 1600° C. in an amount of 10 wt % based on a weight of the molten slag to adjust the viscosity and composition of the molten slag. In this example, no color modifier was added. Next, the molten slag was cast-molded at a temperature of 1500° C. The cast-molded slag was maintained at a temperature of 1000° C. for 5 hours in a non-reducing atmosphere, and then was naturally cooled to a room temperature gradually within 10 hours. As a result, a product having a desired shape and size was obtained as needed.

Example 2

A molten slag including 14 wt % of $Al_2O_3$, 17 wt % of MgO, 28 wt % of $SiO_2$, 32 wt % of CaO, 1.5 wt % of $TiO_2$, 4 wt % of FeO and 3.5 wt % of MnO was used as an original material. The molten slag was cast-molded directly at a temperature of 1400° C. without modifying a composition and a color thereof. The cast-molded slag was maintained at a temperature of 800° C. for 1 hour in a non-reducing atmosphere, and then was gradually cooled to a room temperature within 2 hours. As a result, a product having a desired shape and size was obtained as needed.

Example 3

A molten slag including 15 wt % of $Al_2O_3$, 15 wt % of MgO, 30 wt % of $SiO_2$, 35 wt % of CaO, 1 wt % of $TiO_2$, 2 wt % of FeO and 2 wt % of MnO was used as an original material. Lodestone was added to the molten slag having a temperature of 1500° C. in an amount of 7 wt % based on a weight of the molten slag to adjust the viscosity and composition of the molten slag. Further, iron oxide red was added to the molten slag in an amount of 2 wt % based on the weight of the molten slag to adjust the color of the molten slag. Next, the molten slag was cast-molded at a temperature of 1400° C. The cast-molded slag was maintained at a temperature of 1000° C. for 3 hours in a non-reducing atmosphere, and then was gradually cooled to a room temperature within 6 hours. As a result, a product having a desired shape and size was obtained as needed.

Example 4

A molten slag including 14 wt % of $Al_2O_3$, 17 wt % of MgO, 28 wt % of $SiO_2$, 32 wt % of CaO, 1.5 wt % of $TiO_2$, 4 wt % of FeO and 3.5 wt % of MnO was used as an original material. Clay was added to the molten slag having a temperature of 1450° C. in an amount of 5 wt % based on a weight of the molten slag to adjust the viscosity and composition of the molten slag. Further, iron oxide red was added to the molten slag in an amount of 5 wt % based on the weight of the molten slag to adjust the color of the molten slag. Next, the molten slag was cast-molded at a temperature of 1400° C. The cast-molded slag was maintained at a temperature of 900° C. for 2 hours in a non-reducing atmosphere, and then was gradually cooled to a room temperature within 4 hours. As a result, a product having a desired shape and size was obtained as needed.

The method for manufacturing a reconstituted stone raw material by using a molten slag according to the embodiments of the present invention has the following advantages:

1) An energy-saving and efficient method for comprehensively utilizing the blast furnace slag is provided;

2) The molten slag discharged from the blast furnace is directly utilized, thereby not only saving the power consumption for melting a raw material, but also avoiding the consumption of water for cooling the blast furnace slag by water quench and the generation of the secondary waste; and;

3) The produced reconstituted stone raw material has such characteristics as stable color quality, abrasion resistance, pressure resistance, strong adhesiveness, low coefficient of expansion and low shrinkage ratio.

The present invention is not limited to the above embodiments, and various modification and changes may be made without departing from the scope of the present invention.

What is claimed is:

1. A method for manufacturing a reconstituted stone raw material by using a molten slag, comprising steps performed sequentially:

introducing the molten slag into a pool for preserving heat;

maintaining a temperature of the molten slag in the pool at 1450-1600° C.;

adjusting a composition and/or a color of the molten slag in the pool according to requirements of a resulting product by adding color modifier;

wherein the molten slag is directly discharged from a metallurgy reactor or is a remelted slag, wherein the molten slag includes 10-40 wt % of $Al_2O_3$, 5-25 wt % of MgO, 10-50 wt % of $SiO_2$, 10-40 wt % of CaO, 0.1-5 wt % of $TiO_2$, 0.1-5 wt % of FeO and 0.1-5 wt % of MnO, wherein a composition modifier to adjust the composition is at least one of clay, porcelain clay, lodestone, pottery clay, feldspar and quartz sand and is added in an amount of 0-10 wt % based on a weight of the molten slag, and wherein the color modifier is at least one of Ti oxide, Cr oxide, Ni oxide, Cu oxide, Co oxide, Fe oxide, and ore powder containing at least one of the recited oxides, added in an amount of 0-5 wt % based on the weight of the molten slag;

controlling a temperature of the molten slag at 1400° C.-1500° C. while performing a cast-molding process with the molten slag thereby producing a cast-molded slag; and maintaining the cast-molded slag at a temperature of 800° C.-1000° C. for 1-5 hours in a non-reducing atmosphere, and then;

gradually cooling the cast-molded slag to a room temperature within 2-5 hours to obtain the reconstituted stone raw material.

2. The method according to claim 1, wherein the molten slag includes 10-20 wt % of $Al_2O_3$, 5-10 wt % of MgO, 20-35 wt % of $SiO_2$, 20-30 wt % of CaO, 0.1-5 wt % of $TiO_2$, 0.1-5 wt % of FeO and 0.1-5 wt % of MnO.

3. The method according to claim 1, wherein the color modifier is red mud generated by $Al_2O_3$ manufacture, or iron oxide red.

4. The method according to claim 1, wherein the cast-molding process is performed in a mold or without a mold.

5. The method according to claim 2, wherein the cast-molding process is performed in a mold or without a mold.

6. The method according to claim 1, wherein the method consists of the following steps performed sequentially:

introducing the molten slag into the pool for preserving heat;

maintaining the temperature of the molten slag in the pool at 1450-1600° C.;

controlling the temperature of the molten slag at 1400° C.-1500° C. while performing the cast-molding process with the molten slag thereby producing the cast-molded slag; and maintaining the cast-molded slag at the temperature of 800° C.-1000° C. for 1-5 hours in the non-reducing atmosphere, and then;

gradually cooling the cast-molded slag to the room temperature within 2-5 hours to obtain the reconstituted stone raw material.

\* \* \* \* \*